US006862392B2

(12) United States Patent
Fabian et al.

(10) Patent No.: US 6,862,392 B2
(45) Date of Patent: Mar. 1, 2005

(54) COATED OPTICAL FIBER AND CURABLE COMPOSITIONS SUITABLE FOR COATING OPTICAL FIBER

(75) Inventors: Michelle D. Fabian, Horseheads, NY (US); Gregory S. Glaeseman, Corning, NY (US); David N. Schissel, Painted Post, NY (US)

(73) Assignee: Corning Incorporated, Corning, NY (US)

(*) Notice: Subject to any disclaimer, the term of this patent is extended or adjusted under 35 U.S.C. 154(b) by 11 days.

(21) Appl. No.: 10/454,984

(22) Filed: Jun. 4, 2003

(65) Prior Publication Data

US 2004/0247273 A1 Dec. 9, 2004

(51) Int. Cl.[7] .................................................. G02B 6/22
(52) U.S. Cl. ....................... 385/128; 385/126; 385/127; 385/141; 427/163.2; 522/91; 522/96
(58) Field of Search ................................ 385/126, 127, 385/128, 141; 427/163.2; 522/91, 96

(56) References Cited

U.S. PATENT DOCUMENTS

| | | | |
|---|---|---|---|
| 4,390,565 | A | 6/1983 | Fonda |
| 4,514,037 | A | 4/1985 | Bishop et al. |
| 4,608,409 | A | 8/1986 | Coady et al. |
| 4,889,901 | A | 12/1989 | Shama et al. |
| 4,962,992 | A | 10/1990 | Chapin et al. |
| 5,093,386 | A | 3/1992 | Bishop et al. |

(List continued on next page.)

FOREIGN PATENT DOCUMENTS

| | | |
|---|---|---|
| WO | WO 99/10443 | 3/1999 |
| WO | WO 01/49624 A2 | 7/2001 |
| WO | WO 02/26854 A2 | 4/2002 |
| WO | WO 02/155447 A2 | 7/2002 |
| WO | WO 03/011938 A1 | 2/2003 |

OTHER PUBLICATIONS

Araki et al., "Fracture Toughness of Bisphenol A–Type Epoxy Resin", Journal of Applied Polymer Science, vol. 86, 2002, pp. 2266–2271.

Karger–Kocsis et al., "Toughness Response of Vinylester/Epoxy–Based Thermosets of Interpenetrating Network Structure as a Function of the Epoxy Resin Formulation: Effects of the Cyclohexylene Linkage", Journal of Applied Polymer Science, vol. 88, 2003, pp. 2124–2131.

Rey et al., "Structural Heterogeneities and Mechanical Properties of Vinyl/Dimethacryalte Networks Synthesized by Thermal Free Radical Polymerisation", Elsevier Science, Polymer 43, 2002, pp. 4375–4384.

"Standard Test Method for Tensile Properties of Plastics", ASTM Standard D638–02.

*Primary Examiner*—John P. Lee
*Assistant Examiner*—Paul M. Gurzo
(74) *Attorney, Agent, or Firm*—James V. Suggs; Robert L. Carlson

(57) ABSTRACT

The present invention provides materials suitable for use as secondary coatings of optical fibers. According to one embodiment of the invention, a curable composition includes an oligomer and at least one monomer, which when cured forms a cured polymeric material having a Young's modulus of at least about 1200 MPa, and a fracture toughness of at least about 0.7 MPa·m$^{1/2}$. According to another embodiment of the invention, a coated optical fiber includes an optical fiber; a primary coating encapsulating the optical fiber; and a secondary coating encapsulating the primary coating, the secondary coating having a Young's modulus of at least about 1200 MPa, and a fracture toughness of at least about 0.7 MPa·m$^{1/2}$.

21 Claims, 3 Drawing Sheets

U.S. PATENT DOCUMENTS

| | | | |
|---|---|---|---|
| 5,098,177 A * | 3/1992 | Tanaka .................. 385/110 |
| 5,140,665 A * | 8/1992 | Backer et al. .............. 385/126 |
| 5,259,060 A * | 11/1993 | Edward et al. ............. 385/128 |
| 5,416,880 A * | 5/1995 | Edwards et al. ............ 385/128 |
| 5,527,835 A | 6/1996 | Shustack |
| 5,578,693 A | 11/1996 | Hagstrom et al. |
| 5,639,846 A | 6/1997 | Shustack |
| 5,744,514 A | 4/1998 | Shustack |
| 5,835,656 A * | 11/1998 | Oishi et al. ................ 385/128 |
| 5,837,750 A | 11/1998 | Szum et al. |
| 5,908,484 A | 6/1999 | Decker et al. |
| 6,014,488 A | 1/2000 | Shustack |
| 6,057,034 A | 5/2000 | Yamazaki et al. |
| 6,080,483 A | 6/2000 | Szum et al. |
| 6,136,880 A | 10/2000 | Snowwhite et al. |
| 6,215,934 B1 | 4/2001 | Aloisio, Jr. et al. |
| 6,243,523 B1 | 6/2001 | Aloisio et al. |
| 6,265,476 B1 | 7/2001 | Krongauz et al. |
| 6,298,189 B1 | 10/2001 | Szum et al. |
| 6,319,549 B1 | 11/2001 | Szum et al. |
| 6,472,450 B2 | 10/2002 | Szum et al. |
| 6,531,522 B1 | 3/2003 | Winningham |
| 6,539,152 B1 | 3/2003 | Fewkes et al. |
| 6,553,169 B2 | 4/2003 | Fabian |
| 6,559,197 B2 | 5/2003 | Fewkes et al. |
| 6,563,996 B1 | 5/2003 | Winningham |
| 6,579,914 B1 | 6/2003 | Gantt et al. |
| 6,584,263 B2 | 6/2003 | Fewkes et al. .............. 385/128 |
| 2002/0102086 A1 | 8/2002 | Fewkes et al. |
| 2002/0146225 A1 | 10/2002 | Bultlers et al. |
| 2002/0147248 A1 | 10/2002 | Montgomery et al. |
| 2002/0161154 A1 | 10/2002 | Cattron et al. |
| 2003/0049446 A1 | 3/2003 | Schissel et al. |
| 2003/0059188 A1 | 3/2003 | Baker et al. |
| 2003/0077059 A1 | 4/2003 | Chien et al. |
| 2003/0095770 A1 | 5/2003 | Fewkes et al. .............. 385/128 |
| 2003/0119934 A1 | 6/2003 | Hu |
| 2003/0119998 A1 | 6/2003 | Hu et al. |

* cited by examiner

COATED OPTICAL FIBER AND CURABLE COMPOSITIONS SUITABLE FOR COATING OPTICAL FIBER

BACKGROUND OF THE INVENTION

1. Field of the Invention

The present invention relates generally to optical fiber, and more particularly to coatings for optical fiber and to curable compositions for use in coating optical fiber.

2. Technical Background

Optical fiber has acquired an increasingly important role in the field of telecommunications, frequently replacing existing copper wires. This trend has had a significant impact in all areas of telecommunications, greatly increasing the amount of data that is transmitted. Further increase in the use of optical fiber is foreseen, especially in metro and fiber-to-the-home applications, as local fiber networks are pushed to deliver an ever-increasing volume of audio, video, and data signals to residential and commercial customers. In addition, use of fiber in home and commercial premise networks for internal data, audio, and video communications has begun, and is expected to increase.

Optical fiber is typically made of glass, and usually has a polymeric primary coating and a polymeric secondary coating. The primary coating (also known as an inner primary coating), is typically applied directly to the glass fiber, and when cured forms a soft, elastic, compliant material encapsulating the glass fiber. The primary serves as a buffer to cushion and protect the glass fiber during bending, cabling or spooling. The secondary coating (also known as an outer primary coating) is applied over the primary coating, and functions as a tough, protective outer layer that prevents damage to the glass fiber during processing, handling and use.

The secondary coatings conventionally used in optical fibers are typically crosslinked polymers formed by curing a mixture of an oligomer (e.g. a urethane (meth)acrylate) and at least one monomer (e.g. a (meth)acrylate monomer). Generally, a high Young's modulus is desired in order to provide increased hardness of the protective material. However, an increase in Young's modulus generally serves to increase the brittleness of the material, making it more likely to crack during use. As such, current optical fiber secondary coatings tend to have lower than desirable Young's moduli in order to ensure the necessary robustness.

SUMMARY OF THE INVENTION

One embodiment of the present invention relates to a coated optical fiber comprising an optical fiber having a core and a cladding surrounding the core; a primary coating surrounding the optical fiber; and a secondary coating surrounding the primary, the secondary coating being formed from a cured polymeric material having a Young's modulus of at least about 1200 MPa, and a fracture toughness of at least about 0.7 MPa·m$^{1/2}$.

Another embodiment of the present invention relates to a curable composition comprising an oligomer; and at least one monomer; wherein the curable composition when cured forms a cured polymeric material having a Young's modulus of at least about 1200 MPa, and a fracture toughness of at least about 0.7 MPa·m$^{1/2}$.

Another embodiment of the present invention relates to a coated optical fiber comprising an optical fiber; and a polymeric coating encapsulating the optical fiber, the polymeric coating being formed from a cured polymeric material having a Young's modulus of at least about 1200 MPa, and a fracture toughness of at least about 0.7 MPa·m$^{1/2}$.

The optical fibers, methods, and curable compositions of the present invention result in a number of advantages over prior art devices and methods. The optical fibers of the present invention have secondary coatings with high Young's moduli, and are therefore well-protected from environmental abuse and exhibit reduced sensitivity to microbending. Simultaneously, the optical fibers of the present invention exhibit improved handleability due to the high fracture toughness and high ductility of the secondary coating. Optical fibers according to the present invention may also have secondary coatings having a low sensitivity to the formation of defects.

Additional features and advantages of the invention will be set forth in the detailed description which follows, and in part will be readily apparent to those skilled in the art from the description or recognized by practicing the invention as described in the written description and claims hereof, as well as in the appended drawings.

It is to be understood that both the foregoing general description and the following detailed description are merely exemplary of the invention, and are intended to provide an overview or framework for understanding the nature and character of the invention as it is claimed.

The accompanying drawings are included to provide a further understanding of the invention, and are incorporated in and constitute a part of this specification. The drawings are not necessarily to scale, and sizes of various elements may be distorted for clarity. The drawings illustrate one or more embodiment(s) of the invention, and together with the description serve to explain the principles and operation of the invention.

DETAILED DESCRIPTION OF THE PREFERRED EMBODIMENTS

Figure 1:
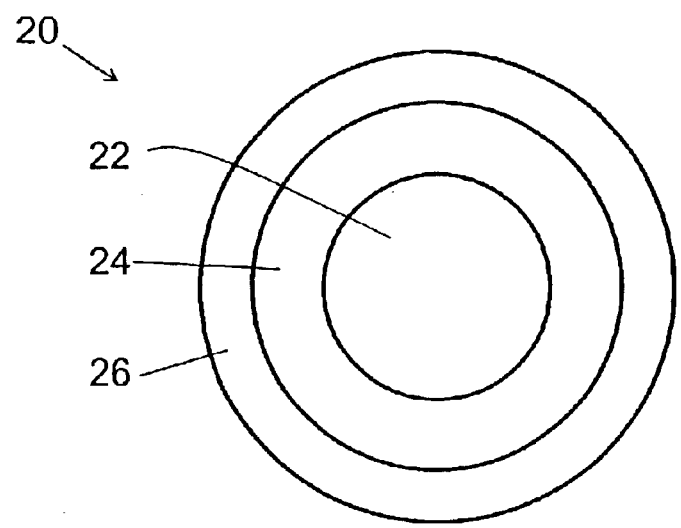
FIG. 1 is a schematic view of a coated optical fiber according one embodiment of the present invention.

One embodiment of the present invention relates to a coated optical fiber. An example of a coated optical fiber is shown in schematic cross-sectional view in FIG. 1. Coated optical fiber 20 includes a glass optical fiber 22 surrounded by primary coating 24 and secondary coating 26. The secondary coating is formed from a cured polymeric material having a Young's modulus of at least about 1200 MPa and a fracture toughness of at least about 0.7 MPa·m$^{1/2}$.

The glass fiber 22 is an uncoated optical fiber including a core and a cladding, as is familiar to the skilled artisan. The uncoated optical fiber may be a single mode fiber, or a multimode fiber. The optical fiber may be adapted for use as a data transmission fiber (e.g. SMF-28®, LEAF®, and METROCOR®, each of which is available from Corning Incorporated of Corning, N.Y.). Alternatively, the optical fiber may perform an amplification, dispersion compensation, or polarization maintenance function. The skilled artisan will appreciate that the coatings described herein are suitable for use with virtually any optical fiber for which protection from the environment is desired.

In coated optical fiber 20, glass fiber 22 is surrounded by a primary coating 24. Primary coating 24 is formed from a soft crosslinked polymer material having a low Young's modulus (e.g. less than about 5 MPa at 25° C.) and a low glass transition temperature (e.g. less than about −10° C.). The primary coating 24 desirably has a higher refractive index than the cladding of the optical fiber in order to allow it to strip errant optical signals away from the optical fiber core. The primary coating should maintain adequate adhesion to the glass fiber during thermal and hydrolytic aging, yet be strippable therefrom for splicing purposes. The primary coating typically has a thickness in the range of 25–40 µm (e.g. about 32.5 µm). Primary coatings are typically applied to the glass fiber as a liquid and cured, as will be described in more detail hereinbelow. Conventional curable compositions used to form primary coatings are formulated using an oligomer (e.g. a polyether urethane acrylate), one or more monomer diluents (e.g. ether-containing acrylates), a photoinitiator, and other desirable additives (e.g. antioxidant). Primary coatings for optical fibers have been well-described in the past, and are familiar to the skilled artisan. Desirable primary coatings are disclosed in U.S. Pat. Nos. 6,326,416; 6,531,522; and 6,539,152; U.S. Patent Application Publication No. 2003/0049446; and U.S. patent application Ser. Nos. 09/712,565; 09/916,536; and 10/087,481, each of which is incorporated herein by reference in its entirety. Another desirable primary coating is the cured reaction product of a primary coating composition including 52 wt % BR3741 (Bomar Specialties); 25 wt % PHOTOMER 4003 (Cognis); 20 wt % TONE M-100 (Dow Chemical); 1.5 wt % IRGACURE 819 (Ciba); 1.5 wt % IRGACURE 184 (Ciba); 1 pph (3-acryloxypropyl)trimethoxysilane (Gelest); and 0.032 pph pentaerythritol tetrakis(3-mercaptoproprionate) (Aldrich).

In coated optical fiber 20, primary coating 24 is surrounded by secondary coating 26. While in FIG. 1, the secondary coating is shown as being applied directly to the primary coating, the skilled artisan will recognize that there may be one or more intermediate coating layers deposited between the primary coating and the secondary coating. Secondary coating 26 is formed from a cured polymeric material, and typically has a thickness in the range of 20–35 µm (e.g. about 27.5 µm). The secondary coating desirably has sufficient stiffness to protect the optical fiber; is flexible enough to be handled, bent, or spooled; has low tackiness to enable handling and prevent adjacent convolutions on a spool from sticking to one another; is resistant to water and chemicals such as optical fiber cable filling compound; and has adequate adhesion to the coating to which it is applied (e.g. the primary coating).

The cured polymeric material of secondary coating 26 of optical fiber 20 has a Young's modulus of at least about 1200 MPa. In desirable embodiments of the invention, the cured polymeric material of secondary coating 26 has a Young's modulus of at least about 1500 MPa. In especially desirable embodiments of the invention, the cured polymeric material of secondary coating 26 has a Young's modulus of at least about 1900 MPa. In desirable embodiments of the invention, the cured polymeric material of secondary coating 26 has an elongation to break of at least about 30%. In especially desirable embodiments of the invention, the cured polymeric material of secondary coating 26 has an elongation to break of at least about 40%. In desirable embodiments of the invention, the cured polymeric material of secondary coating 26 has an average tensile strength of at least about 48 MPa. In especially desirable embodiments of the invention, the cured polymeric material of secondary coating 26 has an average tensile strength of at least about 60 MPa. As used herein, the Young's modulus, elongation to break, and tensile strength of a cured polymeric material are measured using a tensile testing instrument (e.g. a Sinitech MTS Tensile Tester, or an Instron Universal Material Test System) on a sample of a material shaped as a cylindrical rod about 0.0225" (571.5 µm) in diameter, with a gauge length of 5.1 cm, and a test speed of 2.5 cm/min.

Figure 2:
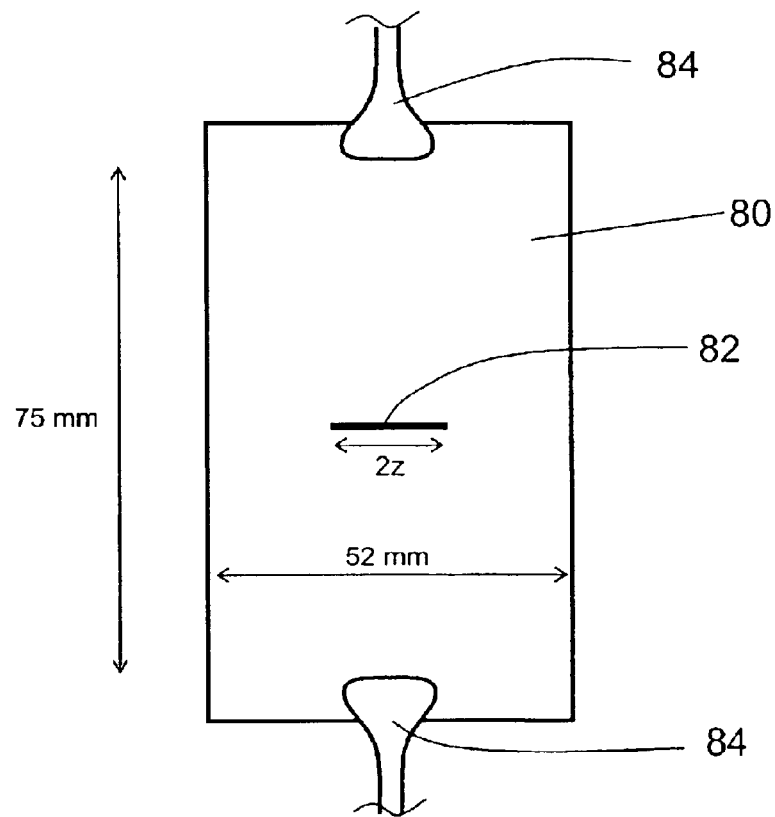
FIG. 2 is a schematic view of a film sample used in the measurement of fracture toughness.

The resistance of a material to unstable, catastrophic crack growth is described by the material property known as fracture toughness, $K_{1C}$. The fracture toughness of a material relates to the energy required to propagate a crack in the material. The cured polymeric material of secondary coating 26 of optical fiber 20 has a fracture toughness of at least about 0.7 MPa·m$^{1/2}$. In desirable embodiments of the invention, the cured polymeric material of the secondary coating has a fracture toughness of at least about 0.9 MPa·m$^{1/2}$. In especially desirable embodiments of the invention, the cured polymeric material of the secondary coating has a fracture toughness of at least about 1.1 MPa·m$^{1/2}$. In certain embodiments of the invention, the cured polymeric material of the secondary coating has a fracture toughness of at least about 1.3 MPa·m$^{1/2}$. As used herein, fracture toughness $K_{1C}$ is measured on film samples, and is defined as $Y\sigma\sqrt{z}$, where Y is a geometry factor, σ is the tensile strength (at break) of the film sample, and z is half of the notch length. Fracture toughness is measured on films having a center cut notch geometry. FIG. 2 is a schematic depiction of the sample geometry used in measuring fracture toughness. Film sample 80 has a width of about 52 mm, and is about 0.010" (254 µm) in thickness. A notch 82 is cut in the center of the film using a sharp blade using methods familiar to the skilled artisan. Notches having lengths of 18 mm, 24 mm, and 30 mm are cut in different samples. The tensile strength (at failure) of the sample, σ, is measured using a tensile testing instrument (e.g. a Sinitech MTS Tensile Tester, or an Instron Universal Material Test System), as described above. The sample is gripped in the jaws 84 of the tensile testing instrument such that the gauge length is 75 mm. The displacement rate is 2.0 mm/min. The tensile strength may be calculated by dividing the applied load at failure by the cross-sectional area of the intact sample. For the samples described above, the tensile strength may be calculated using the equation $$\sigma = \frac{\text{Load}}{254\ \mu m(52\ mm - 2z)}.$$

Y is a geometry factor, and is defined as $1.77 - 0.177(2\lambda) + 1.77(2\lambda)^2$, where λ=z/sample width.

The sensitivity of the cured polymeric material of the secondary coating to handling and the formation of defects is reflected by its ductility. The ductility of a material is defined by the equation $$\text{Ductility} = \left(\frac{K_{1C}}{\text{yield stress}}\right)^2.$$

Larger ductilities indicate reduced sensitivity of the secondary coating to handling and defect formation. Yield stress can be measured on the rod samples at the same time as the Young's modulus, elongation to break, and tensile strength, as described above. As is familiar to the skilled artisan, for samples that exhibit strain softening, the yield stress is determined by the first local maximum in the stress vs. strain curve. More generally, the yield stress can be determined using the method given in ASTM D638-02, which is incorporated herein by reference. In desirable embodiments of the present invention, the cured polymeric material of the secondary coating has a ductility of at least about 314 $\mu$m. In especially desirable embodiments of the present invention, the cured polymeric material of the secondary coating has a ductility of at least about 376 $\mu$m. In certain embodiments of the present invention, the cured polymeric material of the secondary coating has a ductility of at least about 471 $\mu$m.

The coated optical fibers according to one embodiment of the present invention exhibit single fiber strip forces comparable to those of optical fibers having secondary coatings with lower fracture toughnesses. Desirable coated optical fibers of the present invention have single fiber strip forces of less than about 1 pound force at a temperature of 23° C. Especially desirable coated optical fibers of the present invention have single fiber strip forces of less than about 0.8 pounds force at a temperature of 23° C. Strip forces are determined using a method according to FOTP-178, which is incorporated herein by reference. Coated fibers are placed into a load cell, and then stripped at a rate of 0.847 cm/second under environmental conditions of 23° C. and 50% relative humidity.

The cured polymeric materials used in the secondary coatings of the optical fibers of the present invention may be the cured product of a curable composition including an oligomer and at least one monomer. As is conventional, the curable compositions used in forming the secondary coatings may also include photoinitiators, antioxidants, and other additives familiar to the skilled artisan. In desirable embodiments of the invention, the oligomer and monomers of the curable composition are ethylenically unsaturated. In especially desirable embodiments of the invention, the oligomer and monomers of the curable composition are (meth)acrylate-based. The oligomer may be, for example, a urethane (meth)acrylate oligomer. However, as the skilled artisan will recognize, oligomers and monomers adapted for other curing chemistries, such as epoxy, vinyl ether, and thiol-ene, may be used in accordance with the present invention.

Desirably, the oligomer of the curable composition is selected to provide both high modulus and high fracture toughness to the cured polymeric material. The inventors have determined that oligomers that have rigid polyol-derived subunits, multiple functionality, and/or crystallizable moieties are especially desirable for use in the curable compositions of the present invention. Oligomers are described herein by their average structure. For example, an oligomer prepared from 1.0 equivalent of HO—R—OH; 2.0 equivalents of OCN—$R_1$—NCO; and 2.0 equivalents of CAP—OH has the average structure CAP—OOC—NH—$R_1$—NH—[COO—R—OOC—NH—$R_1$—NH]$_{1.0}$—COO—CAP. While the oligomer is, in reality, a mixture of components (e.g., some with two diol blocks, some with one diol block, and some with no diol blocks), the average structure of the oligomer is a weighted average of the components. For cases in which reactants are combined to form an oligomer without subsequent purification, the average structure may conveniently be defined by the stoichiometry of the reactants used to make it.

The oligomers described herein may be synthesized using methods familiar to the skilled artisan, such as those described in U.S. Pat. No. 4,6087,409 to Coady et al., and U.S. Pat. No. 4,609,718 to Bishop et al., each of which is incorporated herein by reference in its entirety. Typically, a polyisocyanate is reacted with a polyol to yield an isocyanate-terminated urethane oligomer, which is then capped with a hydroxy-functional capping agent having a reactive terminus (e.g. (meth)acrylate, epoxy, vinyl ether). Alternatively, the reaction between the polyisocyanate and the polyol may yield a hydroxy-terminated oligomer, which may be capped with an appropriate capping agent, such as an acid chloride or isocyanate, having a reactive functionality. The skilled artisan may use diamines or polyamines in place of some or all of the diol or polyol to provide an oligomer having urea linking moieties.

As used in the examples described herein, polyisocyanates have the structure $R_1(NCO)_j$, where $R_1$ is the polyisocyanate core moiety. The polyisocyanate is incorporated into the oligomer structure with the core moiety $R_1$ being linked into the oligomer by urethane (—NH—COO—) or urea (—NH—CO—NH—) bonds. A non-exhaustive list of polyisocyanates that may be desirable for use in the curable compositions of the present invention is given in Table 1, below.

TABLE 1

| Chemical Name | $R_1$ | Structure |
|---|---|---|
| 4,4'-methylenebis(cyclohexylisocyanate) | H12MDI | |
| toluene diisocyanate | TDI | (mixture of 2,4- and 2,6-) |

TABLE 1-continued

| Chemical Name | R₁ | Structure |
|---|---|---|
| isophorone diisocyanate | IPDI | 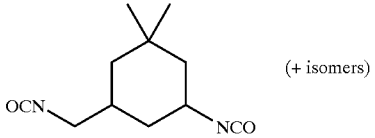 (+ isomers) |
| α,α,α',α'-tetramethyl-1,3-xylylene diisocyanate | TMXDI | 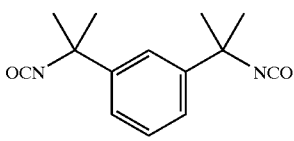 |
| tris(6-isocyanatohexyl)isocyanurate | HDIT | 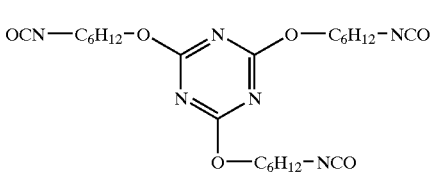 |

In the examples described herein, the capping agent has the structure CAP—OH, where the capping moiety CAP includes a reactive terminus (e.g. (meth)acrylate, epoxy, vinyl ether). In these examples, the capping agent is linked into the oligomer structure by a urethane bond. A non-exhaustive list of capping agents that may be desirable for use in acrylate-based curable compositions of the present invention is given in Table 2, below.

TABLE 2

| Chemical Name | R₁ | Structure |
|---|---|---|
| caprolactone acrylate | CLA | 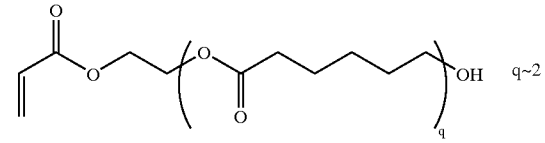 q~2 |
| (2-hydroxyethyl)acrylate | HEA | 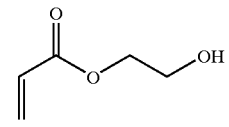 |
| pentaerythritol triacrylate | PETA | 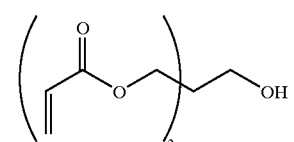 |
| (3-hydroxypropyl)acrylate | HPA | 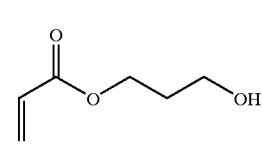 |
| (4-hydroxybutyl)acrylate | HBA | 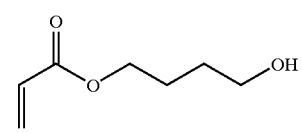 |

TABLE 2-continued

| Chemical Name | $R_1$ | Structure |
|---|---|---|
| monoacrylated poly(propylene glycol), $M_n$~475 Daltons | PPGA | 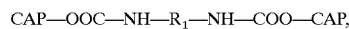 |

According to one embodiment of the invention, the oligomer has a diisocyanate-derived core linked to two capping moieties through urethane bonds. One example of a suitable class of oligomers for use in the curable compositions of the present invention has the structure

CAP—OOC—NH—$R_1$—NH—COO—CAP, where CAP is a capping moiety having a reactive terminus, and $R_1$ is substantially free of urethane bonds. Desirably, at least 50 wt % of the total oligomer content of the formulation has the above structure. Desirably, the oligomer according to this embodiment of the invention has a number average molecular weight ($M_n$) of less than about 1600 Daltons. In especially desirable embodiments of the invention, this oligomer has a $M_n$ of less than about 1200 Daltons. Examples of such oligomers include CLA—OOC—NH—H12MDI—NH—COO—CLA;
CLA—OOC—NH—IPDI—NH—COO—CLA; and
CLA—OOC—NH—TMXDI—NH—COO—CLA.

As the skilled artisan will appreciate, HEA-capped versions of these oligomers may also be used.

According to another embodiment of the invention, the oligomer has a number average molecular weight ($M_n$) of less than about 1600 Daltons. Examples of low molecular weight oligomers include

[HEA—OOC—NH—TDI—NH—COO—PO2NPG—OOC—NH]$_2$TDI
CLA—OOC—NH—H12MDI—NH—COO—CLA;
CLA—OOC—NH—IPDI—NH—COO—CLA; and
CLA—OOC—NH—TMXDI—NH—COO—CLA, where PO2NPG is a propoxylated (1PO/OH) neopentyl glycol-derived moiety having the average structure $(CH_3)_2C[CH_2OCH_2CH(CH_3)—]_2$.

According to another embodiment of the invention, the oligomer has an average functionality (i.e. average number of reactive termini) greater than 2.2. Desirably, the oligomer has an average functionality of at least about 3. One example of a suitable class of oligomers for use in the curable compositions of the present invention has the average structure $R_M$[OOC—NH—$R_A$—NH—COO—CAP]$_n$, where $R_M$ is a multifunctional core moiety, n is greater than 2.2, and CAP is a capping moiety having a reactive terminus. In certain embodiments of the invention, $R_A$ is an isocyanate-derived core moiety $R_1$ that is substantially free of urethane bonds. In other embodiments of the invention, $R_A$ has the structure —$R_1$—(NH—COO—$R_C$—OOC—NH—$R_1$)$_t$—, where $R_C$ is a polyol-derived core moiety and t has an average value in the range of 0 to about 4. Certain desirable oligomers suitable for use in this embodiment of the invention have number average molecular weights of less than about 3000 Daltons. Examples of suitable members of this class of oligomers include PHOTOMER 6008;
GlyPO$_{(725)}$[OOC—NH—H12MDI—NH—COO—HEA]$_3$;
GlyPO$_{(725)}$[OOC—NH—H12MDI—NH—COO—CLA]$_3$;
GlyPO$_{(725)}$[OOC—NH—TMXDI—NH—COO—CLA]$_3$;
GlyPO$_{(725)}$[OOC—NH—TDI—NH—COO—CLA]$_3$;
GlyPO$_{(725)}$[OOC—NH—TDI—NH—COO—PETA]$_3$;
PertPO$_{(426)}$[OOC—NH—H12MDI—NH—COO—CLA]$_4$;
UMB2005[OOC—NH—H12MDI—NH—COO—HEA]$_{2.4}$;
TMPPO[OOC—NH—IPDI—NH—COO—PPG$_{(425)}$—OOC—NH—IPDI—NH—COO—HEA]$_3$; and
TMPPO[OOC—NH—IPDI—NH—COO—T$_{(650)}$—OOC—NH—IPDI—NH—COO—HEA]$_3$, where UMB2005 is the residue of a hydroxy-functional (2.4 OH/molecule on average) poly(butyl acrylate) having an $M_n$~2600 Daltons available from Esprix Technologies; PertPO$_{(426)}$ is a propoxylated pentaerythrityl moiety having the average structure C[CH$_2$(OCHCH$_3$CH$_2$)$_x$—]$_4$; GlyPO$_{(725)}$ is a propoxylated glyceryl moiety having an $M_n$~725 Daltons and the average structure

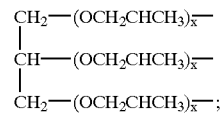

and TMPPO is a propoxylated (1 propoxy/OH) trimethanolpropane moiety having the average structure

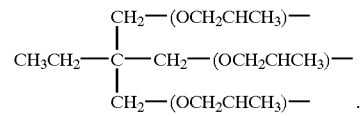

PHOTOMER 6008 is an aliphatic urethane triacrylate oligomer available from Cognis. The skilled artisan will recognize that other combinations of $R_M$, $R_A$, and CAP can be used in the oligomers of this class.

Multiple functionality can also be achieved by the use of a substantially linear oligomer backbone with a multifunctional capping agent such as PETA. For example one suitable oligomer including a multifunctional capping moiety is PETA—OOC—NH—TDI—NH—COO—PETA.

According to another embodiment of the invention, the oligomer includes a crystallizable polyol-derived block in its structure. As used herein, a crystallizable polyol is one having a melting point of greater than about 0° C. Examples of crystallizable polyols include poly(tetramethylene oxide), available as TERATHANE from E. I. duPont de Nemours and Company; and poly(caprolactone) diol. One example of a suitable class of oligomers for use in the curable compositions of the present invention has the average structure CAP—OOC—NH—$R_1$—NH—[COO—$R_X$—OOC—NH—$R_1$—NH]$_w$—COO—CAP where w is greater than zero, CAP is a capping moiety having a reactive terminus, and $R_X$ includes at least one crystallizable polyol-derived moiety. Examples of average structures of oligomers having crystallizable polyol-derived moieties include

CLA—OOC—NH—H12MDI—NH—COO—$T_{(1000)}$—OOC—NH—H12MDI—NH—COO—CLA;

TMPPO[OOC—NH—IPDI—NH—COO—$T_{(650)}$—OOC—NH—IPDI—NH—COO—HEA]$_3$; and

[HEA—OOC—NH—H12MDI—NH—COO—EO8BPA—OOC—NH—H12MDI—NH—COO]$_2$T$_{(1000)}$, where EO8BPA has the average structure

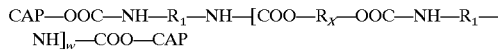
—(CH$_2$CH$_2$O)$_4$—〈 〉—〈 〉—(OCH$_2$CH$_2$)$_4$—;

and $T_{(1000)}$ has an $M_n$~1000 Daltons and the average structure —(CH$_2$CH$_2$CH$_2$CH$_2$O)$_u$(CH$_2$CH$_2$CH$_2$CH$_2$)—. $T_{(650)}$ has an $M_n$~650 Daltons, and a structure analogous to that of $T_{(1000)}$. The skilled artisan will recognize that other combinations of CAP, $R_1$, and $R_X$ can be used in the oligomers of this class.

According to another embodiment of the invention, the oligomer includes rigid subunits in its structure. Desirably, the rigid subunits are in the polyol-derived portion of the oligomer. Examples of rigid subunits include cyclic moieties such as

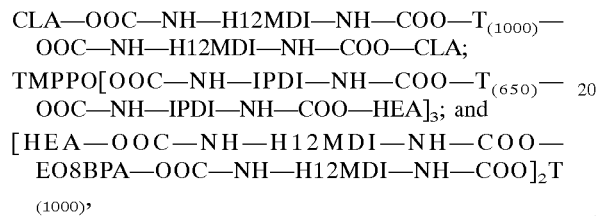
(BPA);

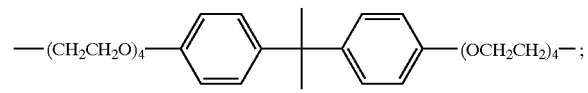

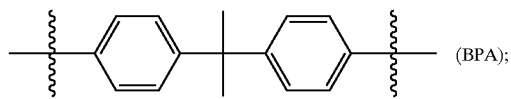
—CH$_2$—〈 〉—CH$_2$— (CHDM) and isomers;

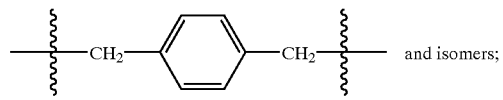
—CH$_2$—〈 〉—CH$_2$— and isomers;

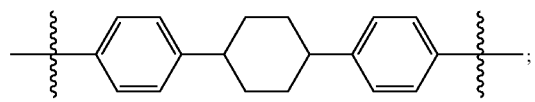
;

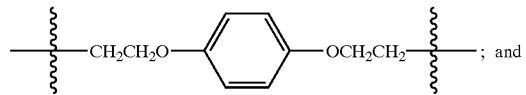
—CH$_2$CH$_2$O—〈 〉—OCH$_2$CH$_2$—; and

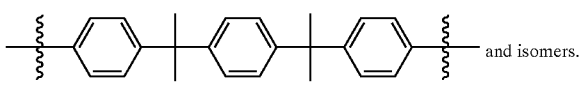
and isomers.

One example of a suitable class of oligomers for use in the curable compositions of the present invention has the average structure CAP—OOC—NH—$R_1$—NH—[COO—$R_L$—OOC—NH—$R_1$—NH]$_w$—COO—CAP where w is greater than zero, CAP is a capping moiety having a reactive terminus, and $R_L$ includes at least one cyclic rigid moiety. For example, $R_L$ may include the moiety —(R$_4$O)$_v$—R$_5$—(OR$_4$)$_v$, where $R_5$ is a rigid cyclic subunit, $R_4$ is ethylene, propylene, or butylene, and v ranges from 0 to 7. Examples of average structures of oligomers having rigid subunits include

[HEA—OOC—NH—H12MDI—NH—COO—PO2BPA—OOC—NH]$_2$H12MDI;

[HEA—OOC—NH—H12MDI—NH—COO—EO8BPA—OOC—NH—H12MDI—NH—COO]$_2$T$_{(1000)}$;

[HEA—OOC—NH—H12MDI—NH—COO—BPA—OOC—NH—H12MDI—NH—COO]$_2$PPG$_{(425)}$;

[HEA—OOC—NH—TDI—NH—COO—BPA—OOC—NH—TDI—NH—COO]$_2$PPG$_{(425)}$;

[HEA—OOC—NH—IPDI—NH—COO—BPA—OOC—NH]$_2$IPDI;

[HEA—OOC—NH—TDI—NH—COO—BPA—OOC—NH]$_2$TDI;

[HEA—OOC—NH—H12MDI—NH—COO—BPA—OOC—NH]$_2$H12MDI;

[HEA—OOC—NH—TDI—NH—COO—CHDM—OOC—NH]$_2$TDI; and

[PETA—OOC—NH—TDI—NH—COO—PO2BPA—OOC—NH]$_2$TDI, where PO2BPA has the average structure

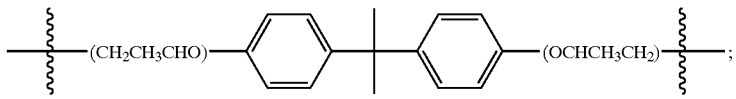

$T_{(1000)}$ has an $M_n \sim 1000$ Daltons and the average structure —$(CH_2CH_2CH_2CH_2O)_u(CH_2CH_2CH_2CH_2)$—; and $PPG_{(425)}$ has an $Mn \sim 425$ Daltons and average structure —$(CHCH_3CH_2O)_s(CHCH_3CH_2)$—. As the skilled artisan will appreciate, other combinations of CAP, $R_1$, and $R_L$ can be used in the oligomers of the present invention.

According to another embodiment of the invention, the oligomer includes both rigid polyol-derived subunits and multiple functionality. One example of a suitable class of oligomers for use in the curable compositions of the present invention has the average structure

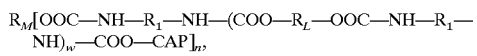

where w is greater than zero, n is greater than 2.2, CAP is a capping moiety having a reactive terminus, and $R_L$ includes at least one cyclic rigid moiety. Examples of average structures of this class of oligomers include GlyPO$_{(725)}$[OOC—NH—IPDI—NH—COO—BPA—OOC—NH—IPDI—NH—COO—HEA]$_3$;
GlyPO$_{(725)}$[OOC—NH—H12MDI—NH—COO—BPA—OOC—NH—H12MDI—NH—COO—HEA]$_3$;
GlyPO$_{(725)}$[OOC—NH—TDI—NH—COO—BPA—OOC—NH—TDI—NH—COO—HEA]$_3$;
GlyPO$_{(725)}$[OOC—NH—TDI—(NH—COO—BPA—OOC—NH—TDI)$_2$—NH—COO—HEA]$_3$;
GlyPO$_{(725)}$[OOC—NH—TDI—NH—COO—CHDM—OOC—NH—TDI—NH—COO—HEA]$_3$;
GlyPO$_{(725)}$[OOC—NH—TDI—NH—COO—BPA—OOC—NH—TDI—NH—COO—CLA]$_3$;
GlyPO$_{(1500)}$[OOC—NH—TDI—NH—COO—BPA—OOC—NH—TDI—NH—COO—HEA]$_3$;
PertPO$_{(426)}$[OOC—NH—IPDI—NH—COO—BPA—OOC—NH—IPDI—NH—COO—HEA]$_4$;
PertPO$_{(426)}$[OOC—NH—TDI—NH—COO—BPA—OOC—NH—TDI—NH—COO—HEA]$_4$;
PertPO$_{(426)}$[OOC—NH—TDI—(NH—COO—BPA—OOC—NH—TDI)$_2$—NH—COO—HEA]$_4$; and
TMPPO[OOC—NH—TDI—NH—COO—BPA—OOC—NH—TDI—NH—COO—HEA]$_3$, where GlyPO$_{(1500)}$ is a is a propoxylated glyceryl moiety having an $M_n \sim 1500$ Daltons. As the skilled artisan will appreciate, other combinations of CAP, $R_1$, $R_M$ and $R_L$ can be used in the oligomers of the present invention.

The skilled artisan may use other conventional oligomers in the curable compositions of the present invention. For example, the oligomer may be the capped product of the reaction of a dihydric polyether, polyester, or polycarbonate with an aliphatic or aromatic diisocyanate. When it is desirable to provide increased moisture resistance, the skilled artisan may use oligomers based on nonpolar diols, such as saturated aliphatic diols. Examples of commercially available oligomers suitable for use in the curable compositions of the present invention include BR301 and KWS4131, from Bomar Specialty Co.; RCC12-892 and RCC13-572, from Cognis Corp; PHOTOMER 6010, from Cognis Corp; and EBECRYL 8800, 4883, 8804, 8807, 8402, and 284, from UCB Radcure.

The curable compositions of the present invention also include one or more monomers having reactive termini selected to react with the reactive termini of the oligomer. In general, individual monomers capable of greater than about 80% conversion are more desirable than those having lower conversion rates. The degree to which monomers having low conversion rates can be introduced into the curable composition depends upon the particular requirements of the desired cured polymeric material. Typically, higher conversion rates will yield stronger cured products.

Suitable polyfunctional ethylenically unsaturated monomers for use in the curable compositions of the present invention include, without limitation, alkoxylated bisphenol A diacrylates such as ethoxylated bisphenol A diacrylate with ethoxylation being 2 or greater, preferably ranging from 2 to about 30, and propoxylated bisphenol A diacrylate with propoxylation being 2 or greater, preferably ranging from 2 to about 30 (e.g., PHOTOMER 4025 and PHOTOMER 4028, available from Cognis Corp. (Ambler, Pa.)); methylolpropane polyacrylates with and without alkoxylation such as ethoxylated trimethylolpropane triacrylate with ethoxylation being 3 or greater, preferably ranging from 3 to about 30 (e.g., PHOTOMER 4149, Cognis Corp., and SR499, Sartomer Company, Inc.), propoxylated trimethylolpropane triacrylate with propoxylation being 3 or greater, preferably ranging from 3 to 30 (e.g., PHOTOMER 4072, Cognis Corp.), and ditrimethylolpropane tetraacrylate (e.g., PHOTOMER 4355, Cognis Corp.); alkoxylated glyceryl triacrylates such as propoxylated glyceryl triacrylate with propoxylation being 3 or greater (e.g., PHOTOMER 4096, Cognis Corp.); erythritol polyacrylates with and without alkoxylation, such as pentaerythritol tetraacrylate (e.g., SR295, available from Sartomer Company, Inc. (Westchester, Pa.)), ethoxylated pentaerythritol tetraacrylate (e.g., SR494, Sartomer Company, Inc.), and dipentaerythritol pentaacrylate (e.g., PHOTOMER 4399, Cognis Corp., and SR399, Sartomer Company, Inc.); isocyanurate polyacrylates formed by reacting an appropriate cyanuric acid with an acrylic acid or acryloyl chloride, such as tris(2-hydroxyethyl) isocyanurate triacrylate (e.g., SR368, Sartomer Company, Inc.) and tris(2-hydroxyethyl) isocyanurate diacrylate; alcohol polyacrylates with and without alkoxylation such as cyclohexane dimethanol diacrylate (e.g., CD406, Sartomer Company, Inc.) and ethoxylated polyethylene glycol diacrylate with ethoxylation being 2 or greater, preferably ranging from about 2 to 30; epoxy acrylates formed by adding acrylate to bisphenol A diglycidylether and the like (e.g., PHOTOMER 3016, Cognis Corp.); and single and multi-ring cyclic aromatic or non-aromatic polyacrylates such as tricyclodecane dimethanol diacrylate, dicyclopentadiene diacrylate and dicyclopentane diacrylate. Bisphenol A-based monomers are especially desirable for use in the curable compositions of the present invention.

It may be desirable to include a polyfunctional thiol monomer in the curable compositions of the present invention. A polyfunctional thiol monomer can participate in the polymerization through free radical thiol-ene reactions, and will provide a polymer network cross-linked with thioether moieties. Desirably, the polyfunctional thiol has a thiol functionality of at least about 3 thiols/molecule. Examples of suitable polyfunctional thiols include pentaerythritol tetrakis(3-mercaptopropionate); trimethylolpropane tris(3-mercaptopropionate); and CAPCURE LOF, available from Cognis. The polyfunctional thiol monomer is desirably present in the curable composition in an amount of between about 2 wt % and about 20 wt %. In certain desirable curable compositions, the polyfunctional thiol monomer is present in an amount of between about 5 wt % and about 15 wt %.

It may also be desirable to use certain amounts of monofunctional ethylenically unsaturated monomers, which can be introduced to influence the degree to which the cured product absorbs water, adheres to other coating materials, or behaves under stress. Exemplary monofunctional ethylenically unsaturated monomers include, without limitation, hydroxyalkyl acrylates such as 2-hydroxyethyl acrylate, 2-hydroxypropyl acrylate, and 2-hydroxybutyl acrylate; long- and short-chain alkyl acrylates such as methyl acrylate, ethyl acrylate, propyl acrylate, isopropyl acrylate, butyl acrylate, amyl acrylate, isobutyl acrylate, t-butyl acrylate, pentyl acrylate, isoamyl acrylate, hexyl acrylate, heptyl acrylate, octyl acrylate, isooctyl acrylate, 2-ethylhexyl acrylate, nonyl acrylate, decyl acrylate, isodecyl acrylate, undecyl acrylate, dodecyl acrylate, lauryl acrylate, octadecyl acrylate, and stearyl acrylate; aminoalkyl acrylates such as dimethylaminoethyl acrylate, diethylaminoethyl acrylate, and 7-amino-3,7-dimethyloctyl acrylate; alkoxyalkyl acrylates such as butoxyethyl acrylate, phenoxyethyl acrylate (e.g., SR339, Sartomer Company, Inc.), and ethoxyethoxyethyl acrylate; single and multi-ring cyclic aromatic or non-aromatic acrylates such as cyclohexyl acrylate, benzyl acrylate, dicyclopentadiene acrylate, dicyclopentanyl acrylate, tricyclodecanyl acrylate, bornyl acrylate, isobornyl acrylate (e.g., SR506, Sartomer Company, Inc.), tetrahydrofurfuryl acrylate (e.g., SR285, Sartomer Company, Inc.), caprolactone acrylate (e.g., SR495, Sartomer Company, Inc.), and acryloylmorpholine; alcohol-based acrylates such as polyethylene glycol monoacrylate, polypropylene glycol monoacrylate, methoxyethylene glycol acrylate, methoxypolypropylene glycol acrylate, methoxypolyethylene glycol acrylate, ethoxydiethylene glycol acrylate, and various alkoxylated alkylphenol acrylates such as ethoxylated(4) nonylphenol acrylate (e.g., PHOTOMER 4003, Cognis Corp.); acrylamides such as diacetone acrylamide, isobutoxymethyl acrylamide, N,N'-dimethyl-aminopropyl acrylamide, N,N-dimethyl acrylamide, N,N-diethyl acrylamide, and t-octyl acrylamide; vinylic compounds such as N-vinylpyrrolidone and N-vinylcaprolactam; and acid esters such as maleic acid esters and fumaric acid esters.

Most suitable monomers are either commercially available or readily synthesized using reaction schemes known in the art. For example, most of the above-listed monofunctional monomers can be synthesized by reacting an appropriate alcohol or amine with an acrylic acid or acryloyl chloride.

According to one embodiment of the present invention, the total oligomer content of the curable composition is less than about 25%. In especially desirable embodiments of the invention, the total oligomer content is less than about 15% In desirable embodiments of the present invention, the total monomer content of the curable composition is greater than about 65%. In especially desirable embodiments of the invention, the monomer content of the curable composition is greater than about 75%. Use of relatively low amounts of oligomer allows the skilled artisan to easily formulate curable compositions having a desirable viscosity. As the oligomer is typically a more expensive component of the composition, minimization of the amount of oligomer allows the skilled artisan to reduce the cost of the curable composition, as well as the cost of articles, such as optical fibers, coated therewith. Secondary coating compositions having low oligomer content are described in more detail in U.S. patent application Ser. No. 09/722,895, which is incorporated herein by reference in its entirety. The oligomer is desirable present in the curable composition in a concentration of at least about 1 wt %.

The curable compositions of the present invention may also include a polymerization initiator. The initiator is desirably present in an amount effective to initiate polymerization of the curable composition. Desirable curable compositions of the present invention are adapted to be cured by actinic radiation, and include one or more photoinitiators. For most (meth)acrylate-based curable compositions, conventional photoinitiators, such as ketonic and/or phosphine-oxide based initiators, may be used. Generally, the total photoinitiator content of the curable composition is between about 0.1 and about 10.0 weight percent. More desirably, the total photoinitiator content of the curable composition is between about 1.0 and about 7.5 weight percent. Suitable photoinitiators include, without limitation, 1-hydroxycyclohexylphenyl ketone (e.g., IRGACURE 184 available from Ciba Specialty Chemical (Tarrytown, N.Y.)), (2,6-dimethoxybenzoyl)-2,4,4-trimethylpentyl phosphine oxide (e.g., in commercial blends IRGACURE 1800, 1850, and 1700, Ciba Specialty Chemical), 2,2-dimethoxyl-2-phenyl acetophenone (e.g., IRGACURE 651, Ciba Specialty Chemical), bis(2,4,6-trimethylbenzoyl)phenyl phosphine oxide (e.g., IRGACURE 819, Ciba Specialty Chemical), (2,4,6-trimethylbenzoyl)diphenyl phosphine oxide (e.g., in commercial blend DAROCUR 4265, Ciba Specialty Chemical), 2-hydroxy-2-methyl-1-phenylpropane-1-one (e.g., in commercial blend DAROCUR 4265, Ciba Specialty Chemical) and combinations thereof. It may be desirable to use a combination of an α-hydroxy ketone photoinitiator (e.g., IRGACURE 184) with a bis(acyl)phosphine oxide photoinitator (e.g., IRGACURE 819) to provide both adequate surface cure and adequate cure of the bulk material. Curable compositions for use as secondary coatings in optical fibers may be formulated with a photoinitator having an absorption spectrum that does not completely overlap the absorption spectrum of the photoinitiator used in the primary coating composition, as is described in U.S. patent application Ser. No. 10/086,109, which is incorporated herein by reference in its entirety. Other photoinitiators are continually being developed and used in coating compositions on glass fibers. Any suitable photoinitiator can be introduced into compositions of the present invention.

In addition to the above-described components, the curable compositions of the present invention can optionally include an additive or a combination of additives. Suitable additives include, without limitation, antioxidants, catalysts, lubricants, low molecular weight non-crosslinking resins, adhesion promoters, coupling agents, coloring agents, and stabilizers. Some additives can operate to control the polymerization process, thereby affecting the physical properties (e.g., modulus, glass transition temperature) of the polymerization product formed from the composition. Others can affect the integrity of the polymerization product of the composition (e.g., protect against de-polymerization or oxidative degradation). A desirable antioxidant is thiodiethylene bis(3,5-di-tert-butyl)-4-hydroxyhydrocinnamate, available as IRGANOX 1035 from Ciba Specialty Chemical). A suitable adhesion promoter is an acrylated acid adhesion promoter such as EBECRYL 170, available from UCB Radcure. Titanium and zirconium-based coupling agents and optical brighteners such as those described in U.S. patent application Ser. Nos. 09/726,002 and 09/747,480, each of which is incorporated herein by reference in its entirety, may also be used in the curable compositions of the present invention. Optical brighteners such as UVITEX OB, available from Ciba may also be used in the curable compositions of the present invention.

Other suitable materials for use in secondary coating materials, as well as considerations related to selection of these materials, are well known in the art and are described in U.S. Pat. Nos. 4,962,992 and 5,104,433 to Chapin, which are hereby incorporated herein by reference. Various additives that enhance one or more properties of the coating can also be present, including the above-mentioned additives incorporated in the compositions of the present invention.

Figure 3:
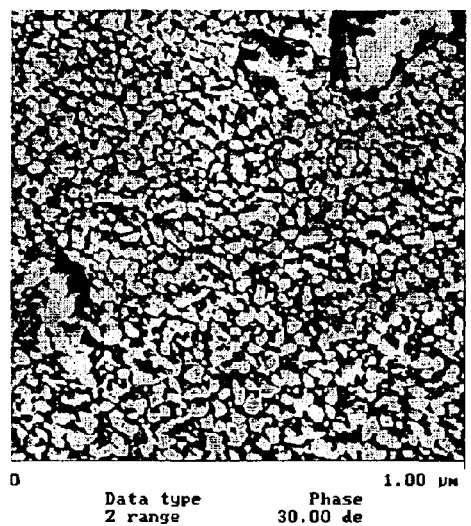
FIG. 3 is a set of atomic force microscopy (AFM) phase maps.
Figure 3:
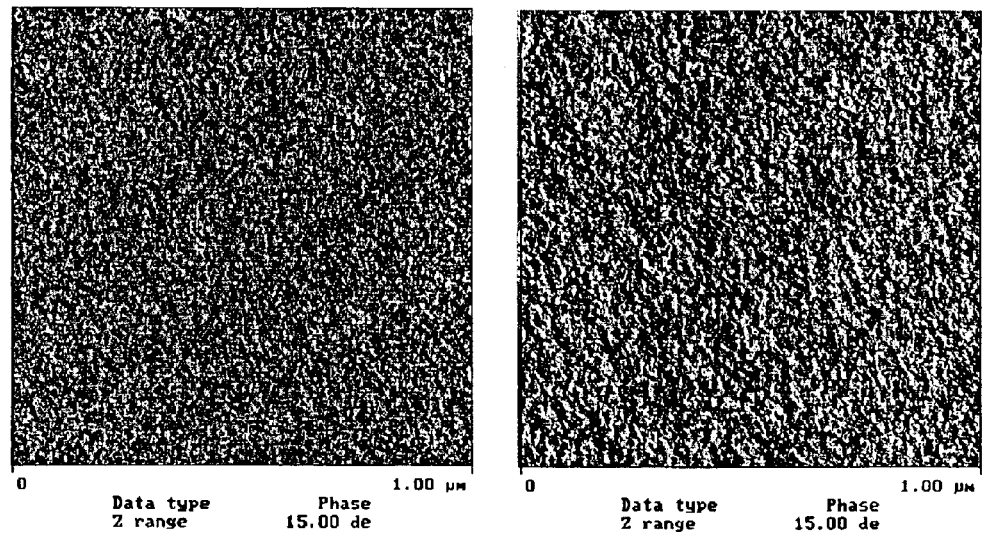

The curable compositions of the present invention may be cured to yield cured polymeric materials having substantially homogeneous morphologies. AFM phase maps for three cured polymeric materials are shown in FIG. 3. These AFM phase maps were generated using a Digital Instruments Nanoscope, with a scan size of 1 $\mu$m, and a scan rate of 1.485 Hz. The top AFM phase map exhibits a substantially inhomogeneous morphology, having large (>30 nm long) bright white grains in a dark background. This AFM phase map is for a cured polymeric material having phase-segregated hard (white) regions. The bottom two AFM phase maps are for cured polymeric materials of the present invention (curable compositions 36 and 2, respectively, of Example 2, below). These AFM phase maps have only miniscule grayish grains, indicating a substantially homogeneous morphology, with little (if any) phase segregation.

Another embodiment of the present invention relates to a method of making an optical fiber including the secondary coating described hereinabove. This method can generally be performed by standard methods with the use of a composition of the present invention. Briefly, the process involves fabricating the glass fiber (using methods familiar to the skilled artisan), applying a primary coating composition to the glass fiber, polymerizing the primary coating composition to form the primary coating material, applying the curable composition described hereinabove to the coated glass fiber, and polymerizing the curable composition to form the cured polymeric material as the secondary coating of the optical fiber. Optionally, the secondary coating composition can be applied to the coated fiber before polymerizing the primary coating composition, in which case only a single polymerization step is employed.

The primary and secondary coating compositions are coated on a glass fiber using conventional processes, for example, on a draw tower. It is well known to draw glass fibers from a specially prepared, cylindrical preform which has been locally and symmetrically heated to a temperature, e.g., of about 2000° C. As the preform is heated, such as by feeding the preform into and through a furnace, a glass fiber is drawn from the molten material. One or more coating compositions are applied to the glass fiber after it has been drawn from the preform, preferably immediately after cooling. The coating compositions are then cured to produce the coated optical fiber. The method of curing can be thermal, chemical, or radiation induced, such as by exposing the applied (and un-cured) coating composition on the glass fiber to ultraviolet light, actinic radiation, microwave radiation, or electron beam, depending upon the nature of the coating composition(s) and polymerization initiator being employed. It is frequently advantageous to apply both a primary coating composition and any secondary coating compositions in sequence following the draw process. One method of applying dual layers of coating compositions to a moving glass fiber is disclosed in U.S. Pat. No. 4,474,830 to Taylor, which is hereby incorporated by reference. Another method for applying dual layers of coating compositions onto a glass fiber is disclosed in U.S. Pat. No. 4,581,165 to Rannell et al., which is hereby incorporated by reference. Of course, the primary coating composition can be applied and cured to form the primary coating material, then the curable composition described hereinabove can be applied and cured to form the cured polymeric material of the secondary coating.

Still another embodiment of the present invention relates to an optical fiber ribbon. The ribbon includes a plurality of optical fibers and a matrix encapsulating the plurality of optical fibers. The matrix is the cured product of a curable composition of the present invention disclosed hereinabove.

Figure 4:
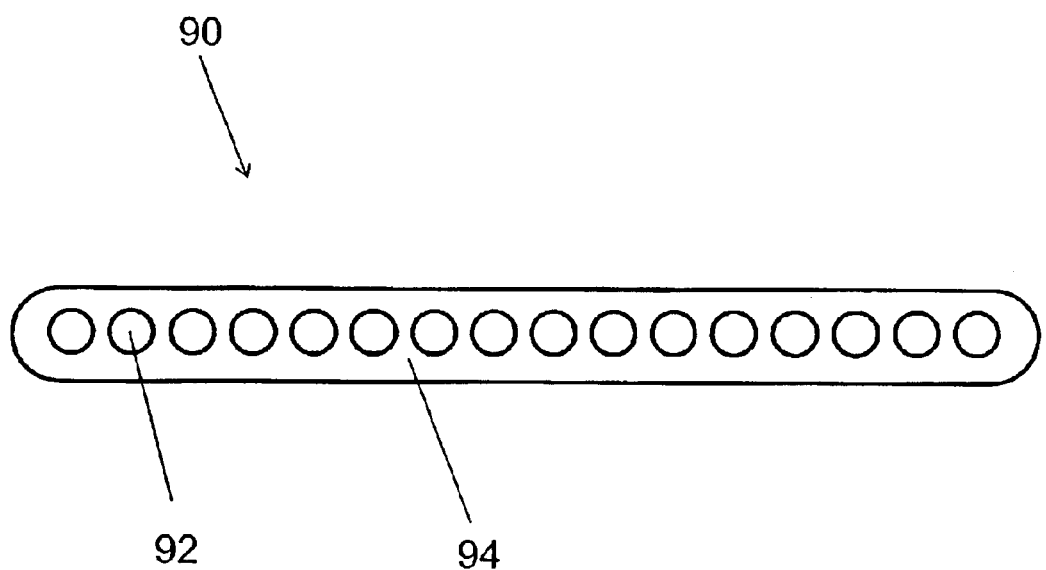
FIG. 4 is a schematic view of an optical fiber ribbon according to an embodiment of the present invention.
Figure 5:
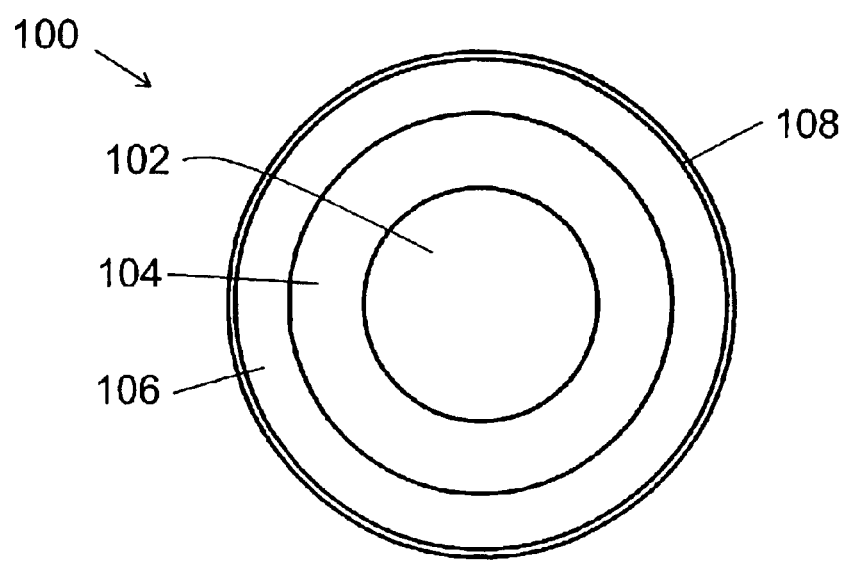
FIG. 5 is a schematic view of an optical fiber including a marking ink according to an embodiment of the present invention.

One embodiment of a ribbon of the present invention is illustrated in FIG. 4. As shown therein, fiber optic ribbon 90 of the present invention includes a plurality of single or multi-layered optical fibers 92 substantially aligned relative to one another in a substantially planar relationship and encapsulated by matrix 94. The skilled artisan will appreciate that the optical fibers 92 may include a dual-layer coating system (for example, the primary and secondary coatings described hereinabove), and may be colored with a marking ink. It is desirable that optical fibers 92 are not displaced from a common plane by a distance of more than about one-half the diameter thereof. By substantially aligned, it is intended that the optical fibers 92 are generally parallel with other optical fibers along the length of the fiber optic ribbon 90. In FIG. 5, the fiber optic ribbon 90 contains sixteen (16) optical fibers 92; however, it should be apparent to those skilled in the art that any number of optical fibers 92 (e.g., two or more) may be employed to form fiber optic ribbon 90 disposed for a particular use.

The optical fibers in fiber optic ribbons of the present invention may be encapsulated by the matrix 94 in any known configuration (e.g., edge-bonded ribbon, thin-encapsulated ribbon, thick-encapsulated ribbon, or multi-layer ribbon) by conventional methods of making fiber optic ribbons.

The fiber optic ribbon may be prepared by conventional methods using the curable composition of the present invention to form the matrix material. For example, upon alignment of a plurality of substantially planar optical fibers, the composition of the present invention can be applied and cured according to the methods of preparing optical fiber ribbons as described in U.S. Pat. No. 4,752,112 to Mayr and U.S. Pat. No. 5,486,378 to Oestreich et al., which are hereby incorporated by reference.

The curable compositions of the present invention may also be advantageously used in the formulation of marking inks for optical fibers. As such, according to another embodiment of the present invention, a coated optical fiber includes an optical fiber; a coating system encapsulating the optical fiber (such as the coating systems described hereinabove), and a marking ink deposited on the exterior of the coating system. For example, FIG. 5 shows a schematic view of a marked optical fiber 100 including a glass optical fiber 102; a coating system including primary coating 104 and secondary coating 106; and a marking ink 108. The marking ink is the cured product of a curable composition of the present invention disclosed hereinabove. A marking ink is typically formed as a thin layer of a colored coating on the outer surface of a secondary coating of an optical fiber. Pigments and/or dyes may be added by the skilled artisan to the curable compositions of the present invention to provide a suitable marking ink. It may be desirable to include a titanate or zirconate coupling agent in the marking ink curable composition, as described in U.S. Pat. No. 6,553,169, which is incorporated herein by reference in its entirety.

The curable compositions and cured polymeric materials of the present invention have been described hereinabove in conjunction with a secondary coating of an optical fiber. However, the skilled artisan will appreciate that the curable compositions and cured polymeric materials described herein may be useful in other coating applications requiring very hard, tough coatings. As such, another embodiment of the present invention relates to a cured polymeric material having a Young's modulus of at least about 1200 MPa and a fracture toughness of at least about 0.7 MPa·m$^{1/2}$. The cured polymeric material may have other desirable properties described hereinabove with reference to the cured polymeric material of the secondary coating of the optical fiber. For example, the cured polymeric material may have a ductility of at least about 38 $\mu$m. The cured polymeric material may be the cured reaction product of the curable compositions of the present invention, described hereinabove.

In order to couple an optical fiber to a device or to another optical fiber, it is typically necessary to strip the dual coating system off of a portion of the optical fiber. The curable compositions of the present invention may be useful in recoating a stripped optical fiber, for example, at a splice joint. As such, another embodiment of the present invention relates to a coated optical fiber including an optical fiber having a core and a cladding; and a polymeric coating encapsulating the optical fiber, the polymeric coating being formed from a cured polymeric material having a Young's modulus of at least about 1200 MPa, and a fracture toughness of at least about 0.7 MPa·m$^{1/2}$. The polymeric coating may be any of the secondary coatings described hereinabove, and may be formed using any of the curable compositions described hereinabove.

EXAMPLES

The present invention is further described by the following non-limiting examples.

Example 1

Oligomer Synthesis

Example oligomers 1–33 were synthesized as described below. Unless otherwise specified, processes conducted under vacuum were conducted at pressures on the order of 1 Torr. The dibutyltin dilaurate, 4-methoxyphenol (MEHQ), phenothiazine and 2,6-di-tert-butyl-4-methylphenol (BHT) were purchased from Aldrich Chemical Co. Polyols used to prepare oligomers were generally heated at 40–50° C. for 12 h under vacuum to remove traces of water prior to use. All other materials were used as received.

Urethane acrylate oligomer 1 with the average structure CLA—OOC—NH—H12MDI—NH—COO—CLA was prepared by mixing 35.0 g (0.133 mole) DESMODUR W (H12MDI(NCO)$_2$, Bayer) with 91.8 g (0.266 mole) caprolactone acrylate (Sartomer, SR495) along with 190 mg dibutlyltin dilaurate and 190 mg BHT at 20° C. The mixture was stirred at this temperature for 1.5 h, and then was heated at 75–85° C. for 3 h.

Urethane acrylate oligomer 2 with the average structure GlyPO$_{(725)}$[OOC—NH—H12MDI—NH—COO—HEA]$_3$ was prepared by slow addition of 75.2 g (0.648 mole) 2-hydroxyethyl acrylate (Aldrich) to an ice-cooled mixture of 170.0 g (0.648 mole) DESMODUR W containing 611 mg BHT and 611 mg dibutyltin dilaurate. Following the addition, the mixture was heated at 75–80° C. for 1 h. The mixture was cooled to less than 65° C. and 156.60 g (0.216 mole) of propoxylated glycerol (M$_n$=725, Aldrich) was added over 1.5 h. The mixture was heated at 75–80° C. for 1 h to complete the reaction.

Urethane acrylate oligomer 8 with the average structure UMB2005[OOC—NH—H12MDI—NH—COO—HEA]$_{2.4}$ was prepared by slow addition of 11.07 g (0.0.095 mole) 2-hydroxyethyl acrylate (Aldrich) to an ice-cooled mixture of 25.0 g (0.095 mole) DESMODUR W containing 144 mg BHT and 144 mg dibutyltin dilaurate. Following the addition, the mixture was heated at 75–80° C. for 1 h. The mixture was cooled to less than 65° C. and 60.13 g (0.023 mole) of UMB2005 (Esprix Technologies, hydroxyl functional [2.4 equivalents per chain]poly(butylacrylate) with M$_n$ about 2600) was added over 45 min. The mixture was heated at 75–80° C. for 1 h to complete the reaction.

Urethane acrylate oligomer 9 with the average structure TMPPO[OOC—NH—IPDI—NH—COO—PPG$_{(425)}$—OOC—NH—IPDI—NH—COO—HEA]$_3$ was prepared by initial addition over 1.5 h of 40.0 g (0.094 mole) of poly(propylene glycol) (Aldrich, M$_n$=425) to an ice cooled mixture of 41.84 g (0.188 mole) of isophorone disocyanate (Aldrich) containing 150 mg of BHT (Aldrich) stabilizer and 150 mg of dibutyltin dilaurate (Aldrich). Following the addition the mixture was heated at 75–80° C. for 2 h. The heat source was removed and the mixture was diluted with 102.4 g PHOTOMER 4028 (ethoxylated (4) bisphenol A diacrylate, Cognis). When the temperature of the mixture was less than 55° C. 10.93 g (0.094 mole) of 2-hydroxyethyl acrylate (Aldrich) was added over 15 min. The mixture was heated at 75–80° C. for 2 h and was then cooled to less than 70° C. when 9.66 g (0.031 mole) of propoxylated (1 PO/OH) trimethylolpropane (Aldrich, Mn=308) was added over 10 min. The mixture was heated at 75–80° C. for 2.5 h to complete the reaction. The end product was a 1:1 mixture of oligomer 9 with PHOTOMER 4028.

Urethane acrylate oligomer 11 with the average structure PETA—OOC—NH—TDI—NH—COO—PETA was prepared by mixing 61.7 g (0.207 mole) pentaerythritol triacrylate along with 120 mg MEHQ, and 120 mg phenothiazine (Aldrich) and heating this under vacuum at 75–80° C. for 1.5 h. The vacuum was released and the mixture was placed under nitrogen and cooled to less than 20° C. when 18.0 g (0.103 mole) toluene diisocyanate was added over 5 min, followed by 160 mg dibutyltin dilaurate. The mixture was then heated at 75–80° C. for 2.5 h to complete the reaction.

Urethane acrylate oligomer 14 with the average structure [HEA—OOC—NH—TDI—NH—COO—PO2BPA—OOC—NH]$_2$TDI was prepared by mixing 40.0 g (0.116 mole) propoxylated (1 PO/OH) bisphenol A (Aldrich) and 130 mg BHT and heating this under vacuum at 75–80° C. for 1 h. The vacuum was removed and 83.85 g PHOTOMER 4028 was added. The mixture was cooled to less than 20° C. and 30.35 g (0.174 mole) toluene diisocyanate (Aldrich, mixture of 2,4 and 2,6 isomers) was added, followed by 130 mg dibutyltin dilaurate. Stirring at 20° C. was continued for 1 h. The mixture was then heated at 75–80° C. for 1 h. The mixture was allowed to cool to less than 70° C. and 13.50 g (0.116 mole) hydroxyethyl acrylate was added over 15 min. The mixture was heated at 75–80° C. for an additional 2 h to complete the reaction. The end product was a 1:1 mixture of oligomer 14 with PHOTOMER 4028.

Urethane acrylate oligomer 15 with the average structure [HEA—OOC—NH—H12MDI—NH—COO—EO8BPA—OOC—NH—H12MDI—NH—COO]$_2$T$_{(1000)}$ was prepared by mixing 60.0 g (0.103 mole) ethoxylated (4 EO/OH) bisphenol A (Aldrich) and 260 mg BHT and heating this under vacuum at 75–80° C. for 1 h, The vacuum was removed and 178.0 g PHOTOMER 4028 was added. The mixture was cooled to less than 20° C. and 54.3 g (0.207 mole) DESMODUR W was added, followed by 260 mg dibutyltin dilaurate. Stirring at 20° C. was continued for 20 min. The mixture was then heated at 75–80° C. for 1.5 h. The mixture was allowed to cool to less than 70° C. and 51.7 g (0.052 mole) of TERATHANE 1000 (Aldrich) was added over 20 min. The mixture was heated at 75–80° C. for 1.5 h and then 12.0 g (0.103 mole) 2-hydroxyethyl acrylate was added, followed by additional heating at 75–80° C. for 1.5 h to complete the reaction. The end product was a 1:1 mixture of oligomer 15 with PHOTOMER 4028.

Urethane acrylate oligomer 23 with the average structure GlyPO$_{(725)}$[OOC—NH—IPDI—NH—COO—BPA—OOC—NH—IPDI—NH—COO—HEA]$_3$ was prepared by initially heating a mixture of 67.8 g PHOTOMER 4028, 15.0 g (0.066 mole) bisphenol A and 100 mg of MEHQ stabilizer at 75–80° C. under vacuum (1 mm) for 1 h. The vacuum was released and the mixture was placed under nitrogen and cooled to less than 20° C. when 29.25 g (0.132 mole) of isophorone diisocyanate was added, followed by 100 mg of dibutyltin dilaurate. The mixture was heated at 75–80° C. for 1.5 h and was then cooled to less than 65° C. when 7.64 g (0.066 mole) of 2-hydroxyethyl acrylate was added over 5 min. The mixture was heated at 75–80° C. for 1.5 h and then cooled again to less than 65° C. followed by addition of 15.90 g (0.022 mole) glycerol propoxylate (Aldrich, M$_n$=725) over 5 min. The mixture was heated at 75–80° C. for 2 h to complete the reaction. The end product was a 1:1 mixture of oligomer 23 with PHOTOMER 4028.

Urethane acrylate oligomers 3–7, 10, 12, 13, 16–22 and 24–34 were prepared using procedures substantially similar to those described above. Structures for these oligomers are given in Table 3; an asterisk after the oligomer number denotes that the oligomer was prepared as a 1:1 mixture of the oligomer with PHOTOMER 4028.

TABLE 3

| Oligomer | Structure |
| --- | --- |
| 3 | GlyPO$_{(725)}$[OOC-NH-H12MDI-NH-COO-CLA]$_3$ |
| 4 | GlyPO$_{(725)}$[OOC-NH-TMXDI-NH-COO-CLA]$_3$ |
| 5 | GlyPO$_{(725)}$[OOC-NH-TDI-NH-COO-CLA]$_3$ |
| 6 | GlyPO$_{(725)}$[OOC-NH-TDI-NH-COO-PETA]$_3$ |
| 7 | PertPO$_{(426)}$[OOC-NH-H12MIDI-NH-COO-CLA]$_4$ |
| 10 | TMPPO[OOC-NH-IPDI-NH-COO-T$_{(650)}$-OOC-NH-IPDI-NH-COO-HEA]$_3$ |
| 12 | CLA-OOC-NH-H12MDI-NH-COO-T$_{(1000)}$-OOC-NH-H12MDI-NH-COO-CLA |
| 13* | [HEA-OOC-NH-H12MDI-NH-COO-PO2BPA-OOC-NH]$_2$H12MDI |
| 16* | [HEA-OOC-NH-H12MDI-NH-COO-BPA-OOC-NH-H12MDI-NH-COO]$_2$PPG$_{(425)}$ |
| 17* | [HEA-OOC-NH-TDI-NH-COO-BPA-OOC-NH-TDI-NH-COO]$_2$PPG$_{(425)}$ |
| 18* | [HEA-OOC-NH-IPDI-NH-COO-BPA-OOC-NH]$_2$IPDI |
| 19* | [HEA-OOC-NH-TDI-NH-COO-BPA-OOC-NH]$_2$TDI |
| 20* | [HEA-OOC-NH-H12MDI-NH-COO-BPA-OOC-NH]$_2$H12MDI |
| 21* | [HEA-OOC-NH-TDI-NH-COO-CHDM-OOC-NH]$_2$TDI |
| 22* | [PETA-OOC-NH-TDI-NH-COO-PO2BPA-OOC-NH]$_2$TDI |
| 24* | GlyPO$_{(725)}$[OOC-NH-H12MDI-NH-COO-BPA-OOC-NH-H12MDI-NH-COO-HEA]$_3$ |
| 25* | GlyPO$_{(725)}$[OOC-NH-TDI-NH-COO-BPA-OOC-NH-TDI-NH-COO-HEA]$_3$ |
| 26* | GlyPO$_{(725)}$[OOC-NH-TDI-(NH-COO-BPA-OOC-NH-TDI)$_2$-NH-COO-HEA]$_3$ |
| 27* | GlyPO$_{(725)}$[OOC-NH-TDI-NH-COO-CHDM-OOC-NH-TDI-NH-COO-HEA]$_3$ |
| 28* | GlyPO$_{(725)}$[OOC-NH-TDI-NH-COO-BPA-OOC-NH-TDI-NH-COO-CLA]$_3$ |
| 29* | GlyPO$_{(1500)}$[OOC-NH-TDI-NH-COO-BPA-OOC-NH-TDI-NH-COO-HEA]$_3$ |
| 30* | PertPO$_{(426)}$[OOC-NH-IPDI-NH-COO-BPA-OOC-NH-IPDI-NH-COO-HEA]$_4$ |
| 31* | PertPO$_{(426)}$[OOC-NH-TDI-NH-COO-BPA-OOC-NH-TDI-NH-COO-HEA]$_4$ |
| 32* | PertPO$_{(426)}$[OOC-NH-TDI-(NH-COO-BPA-OOC-NH-DI)$_2$-NH-COO-HEA]$_4$ |
| 33* | TMPPO[OOC-NH-TDI-NH-COO-BPA-OOC-NH-TDI-NH-COO-HEA]$_3$ |
| 34* | [HEA-OOC-NH-TDI-NH-COO-PO2NPG-OOC-NH]$_2$TDI |

Example 2

Formulation of Curable Compositions

Curable compositions 1–37 were formulated in a jacketed beaker heated to 70° C. using a high-speed mixer. In each case, the components were weighed into the jacketed beaker using a balance and allowed to mix until the solid components were thoroughly dissolved and the mixture appeared homogeneous. Curable compositions are formulated such that the amounts of oligomer, monomer, and photoinitiator total 100 wt %; other additives such as antioxidant are added to the total mixture in units of pph. For oligomers which are provided as a 1:1 mixture of oligomer and monomer, only the oligomeric component is counted as oligomer. For example, a curable composition made with 20% of a 1:1 mixture of oligomer 9 with PHOTOMER 4028 would have 10% oligomer. Table 4 lists the compositional details for each composition. Each composition also includes 1.5% IRGACURE 184, 1.5% IRGACURE 819, and 0.5 pph IRGANOX 1035, each of which is available from Ciba. BLANKOPHOR KLA is a commercially available optical brightener.

TABLE 4

| Curable Composition | |
|---|---|
| 1 | 10% Oligomer 1; 82% PHOTOMER 4028; 5% PHOTOMER 3016; 0.1 pph BLANKOPHOR KLA |
| 2 | 10% Oligomer 2; 82% PHOTOMER 4028; 5% PHOTOMER 3016; 0.1 pph BLANKOPHOR KLA |
| 3 | 10% Oligomer 3; 82% PHOTOMER 4028; 5% PHOTOMER 3016; 0.1 pph BLANKOPHOR KLA |
| 4 | 10% Oligomer 4; 87% PHOTOMER 4028; 5%; 0.1 pph BLANKOPHOR KLA |
| 5 | 10% Oligomer 5; 87% PHOTOMER 4028; 5%; 0.1 pph BLANKOPHOR KLA |
| 6 | 10% Oligomer 6; 82% PHOTOMER 4028; 5% PHOTOMER 3016 |
| 7 | 20% Oligomer 7; 77% PHOTOMER 4028; 0.1 pph BLANKOPHOR KLA |
| 8 | 10% Oligomer 8; 82% PHOTOMER 4028; 5% PHOTOMER 3016; 0.1 pph BLANKOPHOR KLA |
| 9 | 10% Oligomer 9; 82% PHOTOMER 4028; 5% PHOTOMER 3016 |
| 10 | 10% Oligomer 10; 82% PHOTOMER 4028; 5% PHOTOMER 3016 |
| 11 | 10% Oligomer 11; 82% PHOTOMER 4028; 5% PHOTOMER 3016 |
| 12 | 10% Oligomer 12; 82% PHOTOMER 4028; 5% PHOTOMER 3016; 0.1 pph BLANKOPHOR KLA |
| 13 | 10% Oligomer 13; 82% PHOTOMER 4028; 5% PHOTOMER 3016; 0.1 pph BLANKOPHOR KLA |
| 14 | 10% Oligomer 14; 82% PHOTOMER 4028; 5% PHOTOMER 3016; 0.1 pph BLANKOPHOR KLA |
| 15 | 10% Oligomer 15; 82% PHOTOMER 4028; 5% PHOTOMER 3016; 0.1 pph BLANKOPHOR KLA |
| 16 | 10% Oligomer 16; 82% PHOTOMER 4028; 5% PHOTOMER 3016 |
| 17 | 10% Oligomer 17; 82% PHOTOMER 4028; 5% PHOTOMER 3016 |
| 18 | 10% Oligomer 18; 82% PHOTOMER 4028; 5% PHOTOMER 3016 |
| 19 | 10% Oligomer 19; 82% PHOTOMER 4028; 5% PHOTOMER 3016 |
| 20 | 10% Oligomer 20; 82% PHOTOMER 4028; 5% PHOTOMER 3016 |
| 21 | 10% Oligomer 21; 82% PHOTOMER 4028; 5% PHOTOMER 3016 |
| 22 | 10% Oligomer 22; 82% PHOTOMER 4028; 5% PHOTOMER 3016 |
| 23 | 10% Oligomer 23; 82% PHOTOMER 4028; 5% PHOTOMER 3016 |
| 24 | 10% Oligomer 24; 82% PHOTOMER 4028; 5% PHOTOMER 3016 |
| 25 | 10% Oligomer 25; 82% PHOTOMER 4028; 5% PHOTOMER 3016 |
| 26 | 10% Oligomer 26; 82% PHOTOMER 4028; 5% PHOTOMER 3016 |
| 27 | 10% Oligomer 27; 82% PHOTOMER 4028; 5% PHOTOMER 3016 |
| 28 | 10% Oligomer 28; 82% PHOTOMER 4028; 5% PHOTOMER 3016 |
| 29 | 10% Oligomer 29; 82% PHOTOMER 4028; 5% PHOTOMER 3016 |
| 30 | 10% Oligomer 30; 82% PHOTOMER 4028; 5% PHOTOMER 3016 |
| 31 | 10% Oligomer 31; 82% PHOTOMER 4028; 5% PHOTOMER 3016 |
| 32 | 10% Oligomer 32; 82% PHOTOMER 4028; 5% PHOTOMER 3016 |
| 33 | 10% Oligomer 33; 82% PHOTOMER 4028; 5% PHOTOMER 3016 |
| 34 | 10% Oligomer 34; 82% PHOTOMER 4028; 5% PHOTOMER 3016 |
| 35 | 10% Oligomer 7; 82% PHOTOMER 4028; 5% PHOTOMER 3016; 0.1 pph BLANKCOPHOR KLA |
| 36 | 20% PHOTOMER 6008; 77% PHOTOMER 4028 |
| 37 | 20% PHOTOMER 6008; 67% PHOTOMER 4028; 10% pentaerythritol tetrakis(3-mercaptopropionate) |

Example 3

Cured Polymer Material Properties

Curable compositions 1–37 of Example 2 were used to make rod samples for tensile testing. Rods were prepared by injecting the curable compositions into TEFLON tubing with an inner diameter of about 0.025". The samples were cured using a Fusion D bulb at a dose of about 2.6 J/cm$^2$ (measured over a wavelength range of 225–424 nm by a Light Bug model IL390 from International Light). After curing, the TEFLON tubing was stripped, leaving rod samples about 0.0225" in diameter (after shrinkage due to cure). The cured rods were allowed to condition overnight in a laboratory with a controlled temperature of 23° C. and a controlled relative humidity of 50%. Young's modulus, tensile strength, and percent elongation to break were measured for each material using a Sintech MTS Tensile Tester. Yield stress was measured at the same time as the other tensile data for certain of the materials. The gauge length was 5.1 cm, and the test speed was 2.5 cm/min. The reported data are averages of 10 samples, and the reported uncertainties are standard deviations.

Curable compositions 1–35 of Example 2 were also used to make film samples for fracture toughness testing. Film samples were prepared by casting the curable compositions glass plates using a 0.010" draw down bar. The films were cured using a Fusion D bulb at a dose of about 1.4 J/cm$^2$ (measured over a wavelength range of 225–424 nm by a Light Bug model IL390 from International Light). The cured films were allowed to condition overnight in a laboratory with a controlled temperature of 23° C. and a controlled relative humidity of 50%. Fracture toughness $K_{1C}$ was measured on the cured films using the method described hereinabove. Three samples at each of three different notch lengths were measured; the reported value and uncertainty are the mean and standard deviation for all six trials. The ductility for many of the materials was calculated from mean value of $K_{1C}$ and yield stress as described above.

Table 5 shows tensile and fracture toughness data for the cured polymer materials made by curing the curable compositions 1–37.

TABLE 5

| Composition | Tensile strength (MPa) | % Elongation | Young's Modulus (MPa) | $K_{1C}$ (MPa · m$^{1/2}$) | Ductility ($\mu$m) |
|---|---|---|---|---|---|
| 1 | 80.7 ± 8.3 | 58 ± 5 | 1942 ± 37 | 0.898 ± 0.079 | |
| 2 | 66.3 ± 6.5 | 42 ± 7 | 1915 ± 30 | 0.920 ± 0.089 | |
| 3 | 80.5 ± 8.7 | 55 ± 7 | 1934 ± 58 | 0.927 ± 0.066 | |
| 4 | 68.8 ± 4.6 | 50 ± 5 | 1660 ± 95 | 0.860 ± 0.083 | |
| 5 | 70.9 ± 5 | 55 ± 4 | 1729 ± 87 | 1.040 ± 0.114 | |
| 6 | 68.3 ± 5.8 | 40 ± 5 | 2278 ± 89 | 1.315 ± 0.072 | 480 |
| 7 | 71.2 ± 4.4 | 70 ± 4 | 1472 ± 70 | 0.858 ± 0.086 | |
| 8 | 67.1 ± 3.2 | 39 ± 3 | 2096 ± 57 | 1.005 ± 0.045 | |
| 9 | 66.7 ± 5.9 | 46 ± 3 | 1990 ± 41 | 1.052 ± 0.053 | |
| 10 | 55.6 ± 6.1 | 72 ± 10 | 1654 ± 28 | 1.061 ± 0.092 | 543 |
| 11 | 74.1 ± 3.6 | 33 ± 4 | 2472 ± 41 | 1.054 ± 0.110 | 254 |
| 12 | 65.9 ± 5.4 | 59 ± 5 | 1437 ± 64 | 0.774 ± 0.067 | |
| 13 | 73.8 ± 3.2 | 59 ± 4 | 1979 ± 44 | 0.860 ± 0.083 | |
| 14 | 69.2 ± 8.0 | 38 ± 6 | 2502 ± 286 | 1.302 ± 0.086 | |
| 15 | 67.6 ± 6.4 | 56 ± 7 | 1722 ± 52 | 0.880 ± 0.063 | |
| 16 | 67.0 ± 3.7 | 41 ± 7 | 2247 ± 59 | 1.418 ± 0.059 | 500 |
| 17 | 63.4 ± 2.4 | 35 ± 6 | 2265 ± 78 | 1.363 ± 0.079 | 474 |
| 18 | 68.3 ± 4.9 | 45 ± 4 | 2340 ± 77 | 1.398 ± 0.065 | 477 |
| 19 | 64.5 ± 2.4 | 41 ± 4 | 2317 ± 53 | 1.388 ± 0.075 | 500 |
| 20 | 67.6 ± 2.8 | 44 ± 6 | 2368 ± 149 | 1.382 ± 0.137 | 465 |

TABLE 5-continued

| Composition | Tensile strength (MPa) | % Elongation | Young's Modulus (MPa) | $K_{1C}$ (MPa·m$^{1/2}$) | Ductility (μm) |
|---|---|---|---|---|---|
| 21 | 66.2 ± 0.9 | 38 ± 5 | 2336 ± 26 | 1.411 ± 0.061 | 524 |
| 22 | 71.0 ± 5.5 | 38 ± 6 | 2335 ± 39 | 1.378 ± 0.085 | 474 |
| 23 | 66.3 ± 1.8 | 43 ± 5 | 2211 ± 95 | 1.395 ± 0.049 | 480 |
| 24 | 61.8 ± 5.6 | 37 ± 9 | 2093 ± 80 | 1.321 ± 0.091 | 527 |
| 25 | 67.0 ± 3.3 | 46 ± 7 | 2198 ± 52 | 1.443 ± 0.065 | 590 |
| 26 | 66.3 ± 6.1 | 37 ± 13 | 2290 ± 45 | 1.554 ± 0.103 | 628 |
| 27 | 62.0 ± 2.9 | 42 ± 4 | 2204 ± 58 | 1.375 ± 0.060 | 515 |
| 28 | 61.4 ± 2.3 | 37 ± 8 | 2146 ± 50 | 1.352 ± 0.026 | 505 |
| 29 | 57.1 ± 3.2 | 33 ± 8 | 1960 ± 130 | 1.218 ± 0.062 | 452 |
| 30 | 66.5 ± 7.3 | 46 ± 4 | 2263 ± 38 | 1.427 ± 0.068 | 521 |
| 31 | 72.1 ± 3.7 | 46 ± 3 | 2264 ± 133 | 1.334 ± 0.065 | 424 |
| 32 | 79.1 ± 7.1 | 43 ± 9 | 2648 ± 31 | 1.458 ± 0.053 | 395 |
| 33 | 64.7 ± 1.2 | 33 ± 5 | 2567 ± 52 | 1.413 ± 0.080 | 474 |
| 34 | 63.8 ± 2.8 | 39 ± 4 | 2339 ± 60 | 1.431 ± 0.061 | 524 |
| 35 | 69.0 ± 4.6 | 52 ± 5 | 1437 ± 65 | 0.797 ± 0.104 | |
| 36 | 61.4 ± 6.6 | 48 ± 2 | 2014 ± 118 | 1.180 ± 0.048 | 446 |
| 37 | 49.5 ± 0.1 | 71 ± 3 | 1861 ± 69 | 1.963 ± 0.090 | 1831 |

Example 4

Strip Force for Coated Optical Fibers

Optical fibers were coated using one of the primary coating compositions detailed below and the curable compositions of the present invention to form the secondary coating. Primary coating composition A included 52 wt % BR3731, available from Bomar Specialties; 45 wt % PHOTOMER 4003, available from Cognis; 1.5 wt % IRGACURE 184 and 1.5 wt % IRGACURE 819, each of which is available from CIBA; 1 pph IRGANOX 1035, which is available from Ciba; 2 pph bis(trimethoxysilylethyl)benzene; and 0.3 pph (3-mercaptopropyl)trimethoxysilane. Primary coating composition B included 52 wt % BR3741; 25 wt % PHOTOMER 4003; 20 wt% TONE M-100; 1.5 wt % IRGACURE 819; 1.5 wt % IRGACURE 184; and 1 pph (3-acryloxypropyl)trimethoxysilane. Table 6 shows the average peak fiber strip force at 23° C. for five optical fibers according to the present invention.

TABLE 6

| Primary Coating Composition | Secondary Coating Composition | Average Peak Strip Force (lb force) |
|---|---|---|
| A | 1 | 0.534 |
| A | 2 | 0.774 |
| A | 3 | 0.710 |
| A | 13 | 0.709 |
| B | 36 | 0.618 |

It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents.

What is claimed is:

1. A coated optical fiber comprising
  an optical fiber having a core and a cladding surrounding the core;
  a primary coating surrounding the optical fiber; and
  a secondary coating surrounding the primary, the secondary coating being formed from a cured polymeric material having a Young's modulus of at least about 1200 MPa, and a fracture toughness of at least about 0.7 MPa·m$^{1/2}$.

2. The coated optical fiber of claim 1 wherein the cured polymeric material has an average tensile strength of at least about 48 MPa.

3. The coated optical fiber of claim 1, wherein the cured polymeric material has a ductility of at least about 314 μm.

4. The coated optical fiber of claim 1 wherein the cured polymeric material is the cured product of a curable composition including
  an oligomer; and
  at least one monomer.

5. The coated optical fiber of claim 4 wherein the oligomer has the structure

CAP-OOC—NH—R$_1$—NH—COO-CAP where CAP is a capping moiety having a reactive terminus and R$_1$ is substantially free of urethane bonds.

6. The coated optical fiber of claim 4 wherein the oligomer has an M$_n$ of less than about 1600 Daltons.

7. The coated optical fiber of claim 4 wherein the oligomer is a multifunctional oligomer having the average structure R$_M$-[OOC—NH—R$_A$—NH—COO-CAP]$_n$ where R$_M$ is a core moiety having an average functionality of n, where n is greater than 2.2, and CAP is a capping moiety having a reactive terminus.

8. The coated optical fiber of claim 4 wherein the oligomer includes a crystallizable polyol-derived block in its structure.

9. The coated optical fiber of claim 8 wherein the oligomer has the average structure CAP-OOC—NH—R$_1$—NH—[COO—R$_X$—OOC—NH—R$_1$—NH]$_w$—COO-CAP where w is greater than zero, CAP is a capping moiety having a reactive terminus, and
  R$_X$ includes at least one crystallizable polyol-derived moiety.

10. The coated optical fiber of claim 4 wherein the oligomer includes a rigid subunit in the polyol-derived portion of its structure.

11. The coated optical fiber of claim 10 wherein the oligomer has the average structure CAP-OOC—NH—R$_1$—NH—[COO—R$_L$—OOC—NH—R$_1$—NH]$_w$—COO-CAP where w is greater than zero, CAP is a capping moiety having a reactive terminus, and R$_L$ includes at least one cyclic rigid moiety.

12. The coated optical fiber of claim 4 wherein the oligomer is present in the curable composition used to form the secondary coating at a level of less than about 25%.

13. The coated optical fiber of claim 1, wherein the secondary coating has a substantially homogeneous morphology.

14. A curable composition comprising
  an oligomer; and
  at least one monomer;
wherein the curable composition when cured forms a cured polymeric material having a Young's modulus of at least about 1200 MPa, and a fracture toughness of at least about 0.7 MPa·m$^{1/2}$.

15. The curable composition of claim 14, wherein the cured polymeric material has a ductility of at least about 314 μm.

16. The curable composition of claim 14, wherein the oligomer has the structure

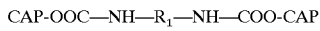

where CAP is a capping moiety having a reactive terminus and $R_1$ is substantially free of urethane bonds.

17. The curable composition of claim 14, wherein the oligomer is a multifunctional oligomer having the average structure

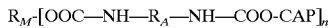

where $R_M$ is a core moiety having an average functionality of n, where n is greater than 2.2, and CAP is a capping moiety having a reactive terminus.

18. The curable composition of claim 14, wherein the oligomer includes in its structure a crystallizable polyol-derived block or a rigid subunit in a polyol-derived portion.

19. An optical fiber ribbon comprising a plurality of optical fibers; and a matrix material encapsulating the plurality of optical fibers, the matrix material being the cured reaction product of the curable composition of claim 14.

20. A coated optical fiber comprising:

an optical fiber;

a coating system encapsulating the optical fiber; and a marking ink deposited on the exterior of the coating system, the marking ink being the cured reaction product of the curable composition of claim 14.

21. A coated optical fiber comprising:

an optical fiber; and a polymeric coating encapsulating the optical fiber, the polymeric coating being formed from a cured polymeric material having a Young's modulus of at least about 1200 MPa, and a fracture toughness of at least about 0.7 MPa·m$^{1/2}$.

* * * * *